Nov. 8, 1927.  
W. S. BURKE  
1,648,257  
METHOD OF PROMOTING HEALTH, GROWTH, AND DEVELOPMENT OF PLANTS IN GREENHOUSES  
Filed Aug. 2, 1922

INVENTOR
Walter S. Burke

Patented Nov. 8, 1927.

1,648,257

UNITED STATES PATENT OFFICE.

WALTER S. BURKE, OF CAMBRIDGE, MASSACHUSETTS.

METHOD OF PROMOTING HEALTH, GROWTH, AND DEVELOPMENT OF PLANTS IN GREENHOUSES.

Application filed August 2, 1922. Serial No. 579,129.

The present invention relates to the treatment of plants in greenhouses. Within the meaning of the term "greenhouses", as used in this specification, I include not only structures or buildings which are commonly called by that name, but also structures made as parts of other buildings and sometimes called "conservatories," and, in general, all spaces which are sufficiently enclosed to permit control of the internal temperature, if desired, and in which plants may be grown.

My object is to improve the rate and the character of growth, the symmetry of development, and the health of the plants maintained in such enclosures; and I have accomplished such object by applying to the plants so enclosed a mode of treatment which wholly or mainly overcomes the causes and tendencies existing in greenhouses detrimental to plant health, growth and development, without in any way diminishing the advantages of such enclosures for plants. This treatment, in all its phases, and including all equivalents of the various phases or steps thereof, constitutes the invention for which I claim protection, and will presently describe in detail.

First, however, a brief preliminary discussion of the nature and causes of the difficulties encountered in the growing of plants under the conditions obtaining in greenhouses will be helpful to a clear understanding of the new step which forms the subject of this invention. It is well known that plants propagated and maintained under such conditions are generally less sturdy, and require more care to conserve their health, than those grown in the open air under the most favorable natural conditions; that they are more susceptible to plant diseases; that they do not develop uniformly in all parts, or as well in any part as plants grown under the most favorable conditions out of doors; that even when apparently healthy their tissues are often relatively weak and contain excessive amounts of water; that plants raised in greenhouses require more or less prolonged and careful hardening treatment before they can safely be set out in the open air, and if they are there set out without proper hardening they frequently die; and that vigorous healthy plants grown out of doors frequently die, or deteriorate greatly in health, when transferred into greenhouses, even when given the best care heretofore known. I do not mean to imply by the foregoing statement that greater or less success cannot be, and is not habitually, attained in raising many varieties of plants in greenhouses, but simply to point to the recognized inferiority of many of the plants so raised to those grown under the most favorable natural conditions. While these effects have been recognized, their causes have not been fully understood, and no remedy has been known which will overcome them.

I have discovered that the causes of the difficulties above mentioned are principally, first, that the plants are motionless practically all of the time—that is, that no movement of the leaves, stem and roots occurs under the artificial conditions obtaining in greenhouses, except casually or accidentally, and infrequently; second, that the air in the vicinity of the leaves and stems of the plants is often excessively humid; third, that the composition otherwise of the air in the same vicinity, and particularly around the leaves, is frequently abnormal, being too high in content of the gases exhaled by the plants and low in content of those gases which the plants need to absorb, and so is unfavorable for plant development; fourth, that drops of water fall on the plants, or condense on them in the form of dew, and frequently remain undislodged or unevaporated for long periods; and fifth, that the temperature in greenhouses is uneven, being too high in some parts and too low in other parts. Incidentally, also, heat is often wasted by the practice of maintaining the coolest parts of the greenhouse, which are near the level of the plants, at a suitable temperature, making other parts, at higher levels, unnecessarily warm and keeping the mean temperature higher than necessary. It is in the means which I have devised for removing these causes, or largely overcoming their effects, that my present invention lies. Such means embraces the circulation of the air in the greenhouse, and the imparting of motion to the stems, leaves and roots of the plants. Such motion may be produced in various ways, mechanically and otherwise, but it is preferably effected by intermittent air currents of suitable force, direction and frequency of occurrence or of change in direction: wherefore the preferred method of treatment within the scope of my invention consists in causing a controlled air current, or simultaneous currents, to flow with such force, at such times, regularly or irregularly, and in such directions, as will give the desired character of bending movement to the stems, and of displacement movement to the roots, stems, and leaves, of the plants. It further consists in stopping, or reducing to a suitable minimum the velocity of, such currents for long enough periods at suitable intervals, to permit growth or absorption of food. It also consists in causing by such air currents the substitution of air having more sutable temperature, moisture content, and composition, for that in those parts of the greenhouse enclosure where these characteristics of the air are unfavorable.

Various mechanical devices and means may be applied for creating and controlling the air currents, including forms of apparatus and equipment available in the open market and capable of being installed by skilled mechanics suitable for carrying out this method. Therefore, in giving a detailed description, and providing a drawing, of apparatus suitable for the purpose, I have intended simply to illustrate the character of the apparatus by the aid of which my method invention can be performed, and not to indicate any limitation in the apparatus which may be used.

Referring, now, to the illustrative drawings herewith furnished,—

Figure 2:
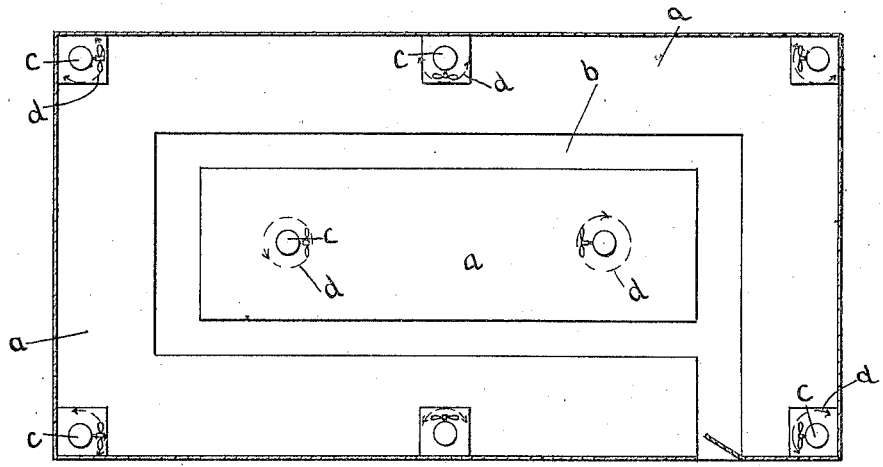
Figure 1:
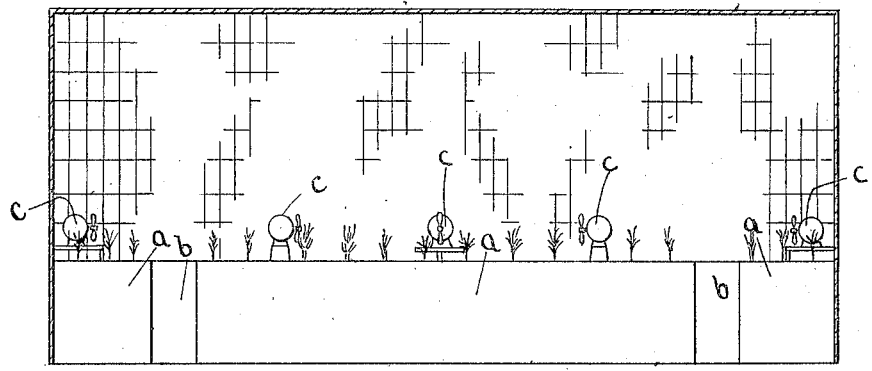
Figure 1 represents a longitudinal section, and Figure 2 a plan, of a typical greenhouse, having electric fans installed as a means for causing the desired air currents and circulation.

The greenhouse shown in Figures 1 and 2 may be considered as having walls and a roof made wholly, or in any desired proportion, of pane-holding frames and glass panes and as having, in its interior, banks or shelves $a$, $a$ supporting beds of earth in which plants grow, and having walks or paths $b$; and also any suitable heating plant or apparatus. Within the four corners of the enclosure thus represented, or at any other suitable locations, are placed electric fans $c$, here indicated as being oscillatable or completely revoluble and adapted to swing in paths denoted by the dotted lines $d$ in Figure 2. Or, I may use stationary fans and provide in connection with them controls adapted to be operated automatically or manually to accelerate and retard the velocity of rotation of their blades between any desired limits, or to reverse the direction of such rotation, from time to time, at regular or irregular periods. Generically, this part of the apparatus comprises means by which variable air currents may be caused to flow in the greenhouse with such force, and in such directions, and at such times as may be needed to impart movement of desired character to the plants, and to maintain desired qualities of composition, humidity, and temperature in the air, or when it is desirable to change the existing condition of the air. Fans and controls of the character indicated are well known articles of commerce obtainable in the open market, and so need not be here described in detail.

Such fans, or equivalent air circulating means, may be provided in any number and placed in any locations, and at any heights, as needed to propel currents adequate in force, directions, and time of occurrence for the purpose in view.

Figure 3:
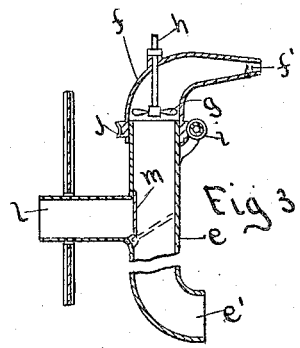
Figure 3 is a sectional detail view of a different suitable form of means for delivering air currents and at the same time for supplying fresh air to the greenhouse.
Figure 4:
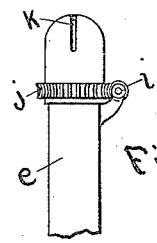
Figure 4 is an elevation of an alternative form of means for the same purpose.

One of the means equivalent to fans which I may use for the same purpose, consists of a blower system having cowls or nozzles located at desired points, and supplied by a single main blower or by individual blowers. Figure 3 illustrates a single nozzle of such a system consisting of a pipe $e$ having an intake at $e'$ to draw air from within the greenhouse, and having on its upper end a revoluble cowl $f$ with a horizontal slot orifice $f'$ designed to emit air in a horizontal fan-shaped stream. A fan $g$ on a shaft $h$, which may be driven by its own electric motor or by any other power delivering means, causes the air flow and typifies means of any sort to that end. The cowl may be rotated or oscillated to change the direction of air stream emitted, for which purpose I have indicated a worm $i$ meshing with an annular worm wheel $j$ on the cowl. An alternative air delivering means, similar in all respects to that just described, except that the cowl has an emission slot $k$ in a vertical plane, to effect a vertical spread of the emitted air stream, is shown in Figure 4.

Ordinarily, enough outside air to supply all the needs of the plants in the way of oxygen and carbon dioxide is admitted in the usual greenhouse without additional special openings. But special openings may be provided, if desired, and I have shown in Figure 3 such an opening, in connection with the circulation pipe, as consisting of a branch $l$ extending from the pipe through the wall of the greenhouse to the outer air. A damper $m$ is indicated for controlling the proportion of air drawn from the interior and exterior of the greenhouse, or for shutting off either source. When desired, the intake for out-door air may be so arranged in connection with a heating apparatus that the incoming air may be heated in cold weather before being discharged into the enclosure.

Air currents of the sort described, blowing intermittently against the plants, cause movements of the plants consisting of displacement of their leaves, bending of their leaf stems and main stems, and slight movements of their roots due to the bending of their main stems or trunks. Such movements, provided they are not carried beyond the limits of harmless strain and occur at suitable times in suitable directions, are beneficial in the following respects, among others.

The leaf movements will (a) cause growth where necessary to improve the attachment of the leaves to the stem, and make the leaves and their stems sturdier by increasing metabolism at the points of stress and strain, (b) when the leaves at the same time are in direct sunlight, cause them to develop more evenly, and increase the effectiveness of the areas subjected to sunlight (photosynthesis). Under usual greenhouse conditions, parts of leaves often get too much light while other parts get too little. Similar favorable effects will occur also in portions of the green stems.

Bending of the stems will cause growth where necessary to make the plant sturdier, by increasing metabolism at the parts of stress and strain.

Movements of the roots, however slight, will (a) favor symmetrical and extensive root development; (b) tend to improve the aeration of the soil; (c) stimulate metabolism and root growth by the mechanical stress and strain due to such movement; (d) cause moisture to move freely toward the roots, thus bringing about conditions most favorable for food absorption; (e) dislodge excreta (solid, liquid, and gaseous) from the roots and favor their removal from the vicinity by drainage and otherwise.

Movement and bending of the various parts of the plant will (a) assist in the distribution throughout the whole organism of the fluids contained in the plant structure; (b) dislodge drops of liquid moisture lying externally on parts of the plants where long continuance of a wet condition is objectionable or dangerous, as at the leaf axils.

Excessive humidity in the air immediately surrounding the plants, previously mentioned as one of the causes of difficulty in raising greenhouse plants, results from evaporation of moisture from the plants and soil into still air. The effects of this condition on the plants are, that dew is deposited on leaves and stems when slight lowering of the temperature occurs, the rate of evaporation from the leaves is checked, and water which is deposited on them by spraying or which drops on them from condensation on overhead structures remains there for long periods. Insufficient evaporation from the leaf pores reduces intake of moisture and dissolved soil foods by the roots, thus hindering nourishment of the cell structures and making the tissues weak. The epidermis becomes soft and porous, a condition favorable for lodgment and growth of spores; and liquid moisture which remains on the plants in these circumstances soon becomes infected with spores. The lens action of drops causes local burning of the plants by the sun's rays, and produces still another condition favorable to infection by spores and harmful to the plants. High temperature of the air and high humidity may, and often do, cause the plants to become overheated. Plant temperatures, like animal temperatures, are kept by evaporation from rising too high.

Air currents of suitable force, direction and frequency will further improve plant development and growth by continually changing the air adjacent to the plants, substituting normal air for that in which the moisture content and composition has become abnormal. This results in (a) removing surface liquid from the plants by evaporation and mechanical action, thus producing conditions unfavorable to growth of spores;

(b) facilitating evaporation from the leaf pores, thus increasing the ability of the plants to resist attack by parasitic organisms and to absorb moisture and soil foods;

(c) removing exhaled gases and supplying gases needed for plant growth;

(d) facilitating respiration of the plants.

Such air currents also give a better distribution of temperature throughout the greenhouse, largely reduce condensation of moisture on the overhead structure, and facilitate pollination of the plants. The intermittency of the currents, by causing changes in the rate of evaporation, produces variations in the temperature of the plants, which makes them swell and shrink alternately, and so facilitates sap circulation and cell stimulation.

Such currents may vary widely in force, time of occurrence or of change in direction of flow, and in rate of change in velocity; but they must be intermittent in the sense that an air stream may not be caused to blow continuously with the same force from the same direction against the same plant. The maximum air velocity must not be great enough to strain the stems injuriously, and ordinarily should not exceed that necessary to bend the main stem very slightly where it issues from the ground, in the case of plants which are supported by their main stems. In the case of vines, it should be great enough to cause vigorous leaf motion without harmfully straining the leaf stems or main stem. Evidently the maximum limit of velocity thus defined will be greater in absolute value with strong and well grown, than with delicate and young plants.

The best results are obtained when the air currents act on the plants alternately from two or more widely separated directions, for then the leaves and stems are moved to different sides from the position of rest, which makes for symmetry of development; but satisfactory results follow if the currents flow in only one direction with such intermissions as will allow the plants to spring back in the meantime. Such changes in direction or velocity of the air currents, or intermissions of the currents, may occur regularly or irregularly, at intervals of time from a fraction of a minute up to many minutes; and increases in velocity should be effected with lapse of enough time before the maximum is attained to permit accommodation of the plants to the force of the current.

Suitable intervals of rest may be given in which the air is still; and ordinarily at night there should be no motion, or at least, the motion should be greatly less than in the daytime; for plant growth is favored by quiet and occurs mainly at night, the cells of the plant then taking up food which has been elaborated in the daytime under the action of light. When the air is again set in motion after a night, or similarly long period of quiet, its motion should not reach the normal maximum, which would ordinarily be very much less than the plant will stand without injury, until after a time sufficient to permit evaporation of enough moisture from the plants to relieve them of the turgid condition which results from accumulation of absorbed water.

The method herein disclosed is applicable to plants of all kinds, including trees, shrubs and vegetables, whether grown for the ornamental effect of their form, or for their flowers or fruits, or for their edible leaves, roots, or tubers. Plants grown in greenhouses, when so treated, are improved in health and strength, they grow more rapidly and develop more symmetrically, they are more hardy and less affected by wide ranges of temperature and other conditions in the greenhouse and by the shock of winds and variable temperatures when set out of doors, they are able better to resist the attacks of harmful minute organisms while being at the same time less subject to such attacks, and those plants which are grown for their fruits produce better fruits, than plants grown in greenhouses under the conditions heretofore existing.

What I claim and desire to secure by Letters Patent is:

1. The method of promoting plant development in greenhouses which consists in imparting bending movements within the limits of harmless strain, to the main stems of such plants from time to time within the course of the day.

2. The method of promoting plant development in greenhouses which consists in imparting bending movements successively in different directions within the limits of harmless strain, to the main stems of such plants from time to time.

3. The method of promoting plant development in greenhouses which consists in moving the leaves of such plants from one position to another repeatedly in the course of the day.

4. The method of promoting plant development in greenhouses which consists in bending the stems and agitating the leaves of such plants, to an extent less than enough to cause harmful strain, in frequent repetition during the daytime.

5. The method of promoting plant development in greenhouses which consists in directing against such plants air currents of varying velocity, the force and velocity of which is sufficient to impart movement to the leaves of the plants, but at the maximum is less than enough to strain them injuriously.

6. The method of promoting plant development in greenhouses which consists in directing air currents successively from different directions against such plants, with force sufficient to move the members of the plants but insufficient to strain them injuriously.

7. The method of promoting plant development in greenhouses which consists in causing intermittent air currents to blow against such plants with a force which gradually increases from the minimum to the maximum, in its impingement on individual plants, and at the maximum is sufficient to impart movement to the plants but insufficient to strain them injuriously.

8. The method of promoting plant development in greenhouses which consists in causing intermittent air currents to blow against such plants with a force which gradually increases from the minimum to the maximum, in its impingement on individual plants, and at the maximum is sufficient to impart movement to the plants but insufficient to strain them injuriously, and from time to time changing the direction of such impingement.

9. The method of promoting plant development in greenhouses which consists in directing against such plants air currents of varying velocity, the force and velocity of which is sufficient to impart movement to the leaves of the plants, but at the maximum is less than enough to strain them injuriously, intermitting and repeating such currents during the daytime, and substantially stopping them in the night time.

10. The method of promoting plant development in greenhouses which consists in impelling air against such plants repeatedly throughout the daytime with varying force which at the maximum is sufficient to move the members of the plants within the limits of harmless strain, and ceasing such air impulsion during the night time.

11. The method of promoting plant development in greenhouses which consists in directing air currents successively from different directions against such plants, with force sufficient to move the members of the plants but insufficient to strain them injuriously and intermitting the causation of such currents during the night time.

12. The method of promoting plant development in greenhouses which consists in impelling air against such plants repeatedly throughout the daytime with varying force which at the maximum is sufficient to move the members of the plants within the limits of harmless strain, and causing such air action to be stopped at times and for periods long enough to permit growth and absorption of food by the plants.

13. The method of promoting development of plants in greenhouses, which consists in so moving the parts of plants above ground that stresses and strains are transmitted to the roots and varying the extent of the movements so given.

14. The method of promoting development of plants in greenhouses, which consists in so moving the parts of plants above ground that stresses and strains are transmitted to the roots and causing such movements to cease at times and for periods long enough to permit growth and absorption of food.

In testimony whereof I have affixed my signature.

WALTER S. BURKE.